United States Patent [19]

Grossman et al.

[11] Patent Number: 5,215,723
[45] Date of Patent: Jun. 1, 1993

[54] COMPACT ANHYDROUS HCL TO AQUEOUS HCL CONVERSION SYSTEM

[75] Inventors: Mark W. Grossman, Belmont; Richard Speer, S. Hamilton, both of Mass.

[73] Assignee: GTE Products Corporation, Danvers, Mass.

[21] Appl. No.: 631,196

[22] Filed: Dec. 20, 1990

Related U.S. Application Data

[63] Continuation of Ser. No. 323,656, Mar. 15, 1989, abandoned.

[51] Int. Cl.$^5$ .............................................. B01J 8/02
[52] U.S. Cl. ........................................ 422/177; 55/71; 55/233; 261/117; 261/118; 422/99; 422/130; 422/187
[58] Field of Search .................... 55/71, 233; 261/117, 261/118; 422/99, 102, 130, 177, 187

[56] References Cited

U.S. PATENT DOCUMENTS

| | | | |
|---|---|---|---|
| 3,792,571 | 2/1974 | Waki et al. | 55/233 |
| 3,897,331 | 7/1975 | Smith et al. | 209/10 |
| 3,983,019 | 9/1976 | Botter nee Bergbeaud | 204/157.21 |
| 4,112,054 | 9/1978 | Feingold et al. | 422/34 |
| 4,379,252 | 4/1983 | Work et al. | 313/485 |
| 4,514,363 | 4/1985 | Dubrin | 423/3 |
| 4,527,086 | 7/1985 | Maya | 313/485 |
| 4,648,951 | 3/1987 | Maya | 204/157.21 |
| 4,678,550 | 7/1987 | Grossman et al. | 204/105 R |
| 4,713,547 | 12/1987 | Grossman | 250/373 |

FOREIGN PATENT DOCUMENTS 0280788 9/1988 European Pat. Off.
0281687 9/1988 European Pat. Off.

OTHER PUBLICATIONS

Webster and Zare, "J. Phys. Chem.", 85:1302 (1981).
McDowell et al., "Can. J. Chem.", 37:1432 (1959).
Gunning and Swartz, "Adv. Photochem.", 1:209 (1963).
Waymouth, "Electric Discharge Lamps", MIT Press (1971).

Primary Examiner—Jill A. Johnston
Attorney, Agent, or Firm—Robert E. Walter

[57] ABSTRACT

The present invention is directed to an inexpensive and compact apparatus adapted for use with a $^{196}$Hg isotope separation process and the conversion of anhydrous HCl to aqueous HCl without the use of air flow to carry the HCl vapor into the converter system.

5 Claims, 3 Drawing Sheets

COMPACT ANHYDROUS HCL TO AQUEOUS HCL CONVERSION SYSTEM

STATEMENT OF GOVERNMENT INTEREST

The Government of the United States of America has rights in this invention pursuant to Subcontract 4540710 under Prime Contract DE-AC03-76SF00098 awarded by the Department of Energy.

This is a continuation of application Ser. No. 07/323,656, filed on Mar. 15, 1989, and now abandoned.

FIELD OF THE INVENTION

The present invention is directed to a method and apparatus useful in the isotopic enrichment of a predetermined isotope of mercury (Hg) from a naturally occurring mercury mixture. While the present invention may be used in the enrichment of any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application in the photochemical enrichment of the $^{196}$Hg isotope, which has a natural abundance of only about 0.146 percent.

Photochemical mercury enrichment processes are well known and have been well documented in the literature. See for example, Webster and Zare, *J. Phys. Chem.*, 85: 1302 (1981); McDowell et al., *Can. J. Chem.*, 37: 1432 (1959); Gunning and Swartz, *Adv. Photochem.*, 1: 209 (1963) and U.S. Pat. Nos., 4,678,550, 4,648,951, and 4,514,363, the teachings of which are hereby incorporated herein by reference.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps*, MIT Press 1971 for a description of the basic principles of such lamps.

In U.S. Pat. No. 4,379,252, (the '252 patent), the advantages of utilizing higher than normal levels of $^{196}$Hg in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need be added to a fluorescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. For example, the compounds HCl and $O_2$ react with mercury atoms when the mercury atoms are excited by resonance radiation, in particular, 2537 Å radiation produced in a Hg ($^3$P - $^1$S$_o$) transition generating isotopically selective reactions. Thus, the Hg compound formed contains Hg enriched in a particular isotope, and the Hg must be separated from the compound into its liquid or free state (i.e., elemental Hg)) in order to recover the isotopically enriched metal.

As described above, anhydrous HCl is used in the photochemical isotope separation of $^{196}$Hg. However, only a small fraction of the HCl present is actually utilized, the rest is deposited as a solid effluent, typically in liquid nitrogen cold traps along with effluent mercury. To recover the mercury, the solid HCl is allowed to liquefy and then vaporize; however, the HCl vapor must be disposed of. Previously this was done by simply exhausting the HCl to the outside air. This can be hazardous, especially in the vicinity of the outside exhaust vent, and particularly during periods of precipitation [e.g., concentrated acid rain].

A standard method of eliminating this problem is to utilize one or more gas scrubbers in series with the ventilation system which removes the anhydrous HCl from the exhaust air. This produces aqueous HCl, which can be neutralized and more easily disposed of. However, gas scrubbers of this type are large and require sophisticated control systems for their operation.

The present invention offers a simple solution to the problem of dealing with anhydrous HCl remaining in mercury enrichment processing.

INFORMATION DISCLOSURE

The following documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al.. U.S. Pat. No. 3,983,019;
Smith et al., U.S. Pat. No. 3,897,331;
Grossman et al., U.S.S.N. 815,150, filed 31 Dec. 1985;
European Patent Publication No. 0 281 687, published 14 Sep. 1988, claiming priority of U.S.S.N. 947,217, filed 29 Dec. 1986, now U. S. Pat. No. 4,789,784 and
European Patent Publication No. 0 280 788, published 7 Sep. 1988, claiming priority of U.S.S.N. 947,216, filed 29 Dec. 1986 now U.S. Pat. No. 4,800,284.

SUMMARY OF THE INVENTION

The present invention is directed to an inexpensive and compact apparatus for converting anhydrous HCl to aqueous HCl in conjunction with the enrichment of $^{196}$Hg, without the use of air flow to carry the HCl vapor into the converter system.

The apparatus of the present invention comprises in combination an anhydrous HCl gas inlet, means for introducing a flow of water relative to the direction of HCl gas flow, and a suitable gas/liquid interaction medium for the formation of aqueous hydrogen chloride through interaction of the gaseous and aqueous species present. The term "relative" as applied to the direction of water flow, is used generically to indicate both a cocurrent and a countercurrent direction of flow with respect to the direction of HCl gas flow [and obviously not both directions at the same time].

Two preferred embodiments of the apparatus of this invention are described herein, one involving a shower of water which flows over an inert (e.g., glass sections) interaction medium, while the anhydrous HCl gas travels against the direction of water flow (a countercurrent wash system); while the other embodiment represents a cocurrent flow system whereby both the water and the HCl gas flow in the same direction over an inert (e.g., glass wool) interaction medium.

DETAILED DESCRIPTION OF THE PREFERRED EMBODIMENTS

Disposal of anhydrous HCl via evaporation and venting through a standard air flow system requires chemically resistant vent components and some type of HCl removal process. The present invention represents an alternative to this standard solution by providing compact and inexpensive anhydrous HCl to aqueous HCl converters or "scrubbers."

Distinct from standard methods, the scrubbing system of the present invention does not require air flow to carry the HCl vapor into the scrubber system. Moreover, using the scrubbing system of the present invention, conversion rates higher than 40 grams per minute have been demonstrated.

The present invention is thus directed to a compact system for "scrubbing" HCl used in a mercury enrichment process, which connects directly to the cold trap of the enrichment apparatus containing the frozen anhydrous HCl. From this location the HCl gas flow rate is controlled by the heat input to the frozen HCl rather than through air flow as in conventional scrubber system.

The changes in state of the frozen HCl, i.e., from solid, to liquid, to gas, provide the pressure necessary to drive the HCl into the scrubber. However, this is effective only until all of the HCl has vaporized. The remaining HCl vapor, usually a very small fraction of the original amount, is finally forced through the scrubber by a slow nitrogen purge. This completes the disposal of the anhydrous HCl without any vapors exhausting to the outside of the system.

Figure 1:
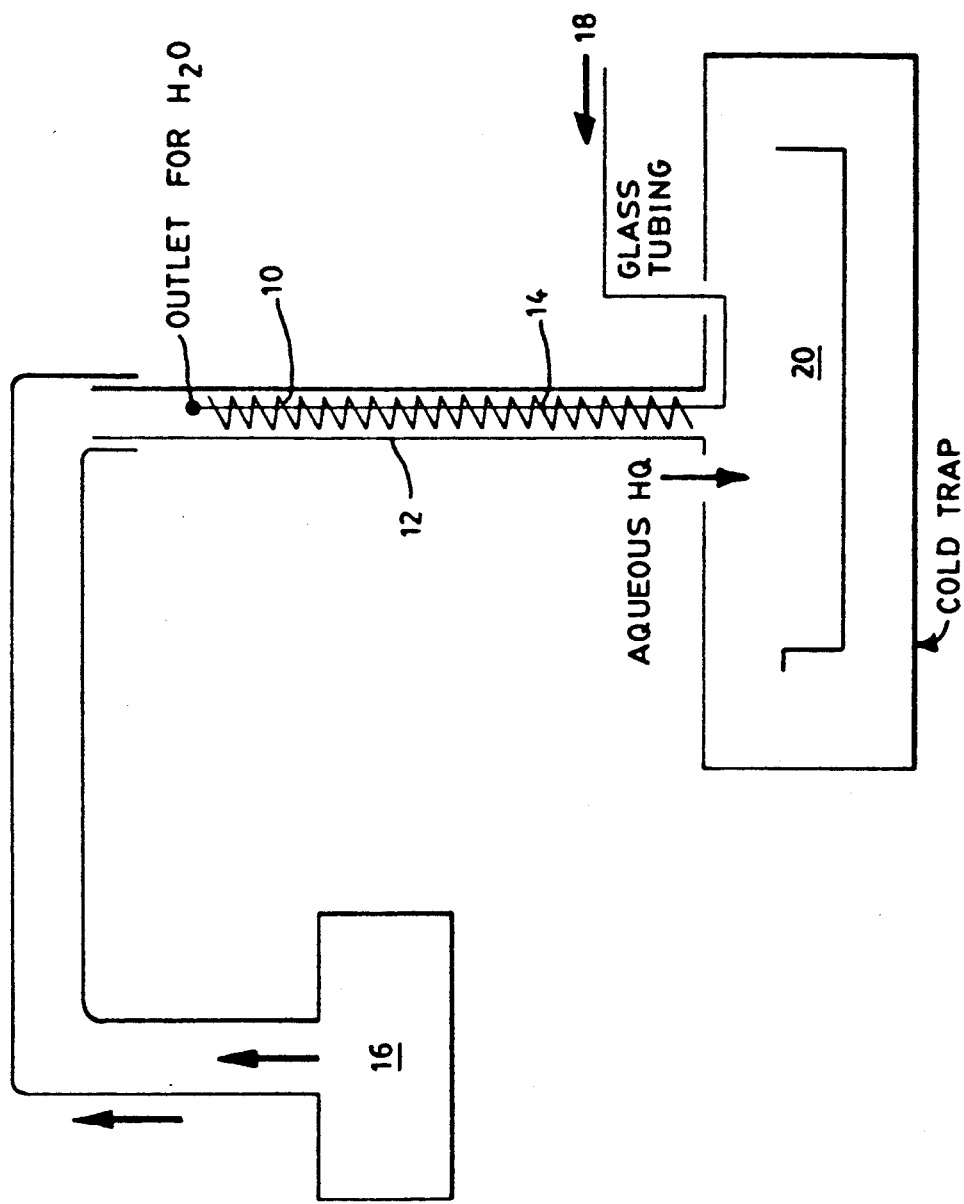
FIG. 1 illustrates the cocurrent HCl anhydrous to aqueous conversion system.

As illustrated in FIG. 1, [System 1], as the HCl vapor is transferred to the scrubber, it passes through a suitable gas/liquid interaction medium. This medium should be inert to the HCl and allow both gas and liquid (e.g., water) to pass therethrough freely. It has been found that glass wool works very well as one such interaction medium. The artisan of ordinary skill in this art area will readily be able to substitute alternate interaction media upon consideration of the teachings of this disclosure.

As illustrated in FIG. 1, the glass wool interaction medium 10 is held in place in the scrubber column 12 by a nickel wire spiral 14. At the same time that the anhydrous HCl gas 16 is passing through the interaction medium, water is forced up through tube 18 such that it exits at a point at or above the top of the glass wool 10, and falls back over the wool in the same direction of travel as the HCl gas. In this way the gaseous HCl mixes with the water prior to entering the collection zone 20, forming aqueous HCl which is collected and removed.

Figure 2:
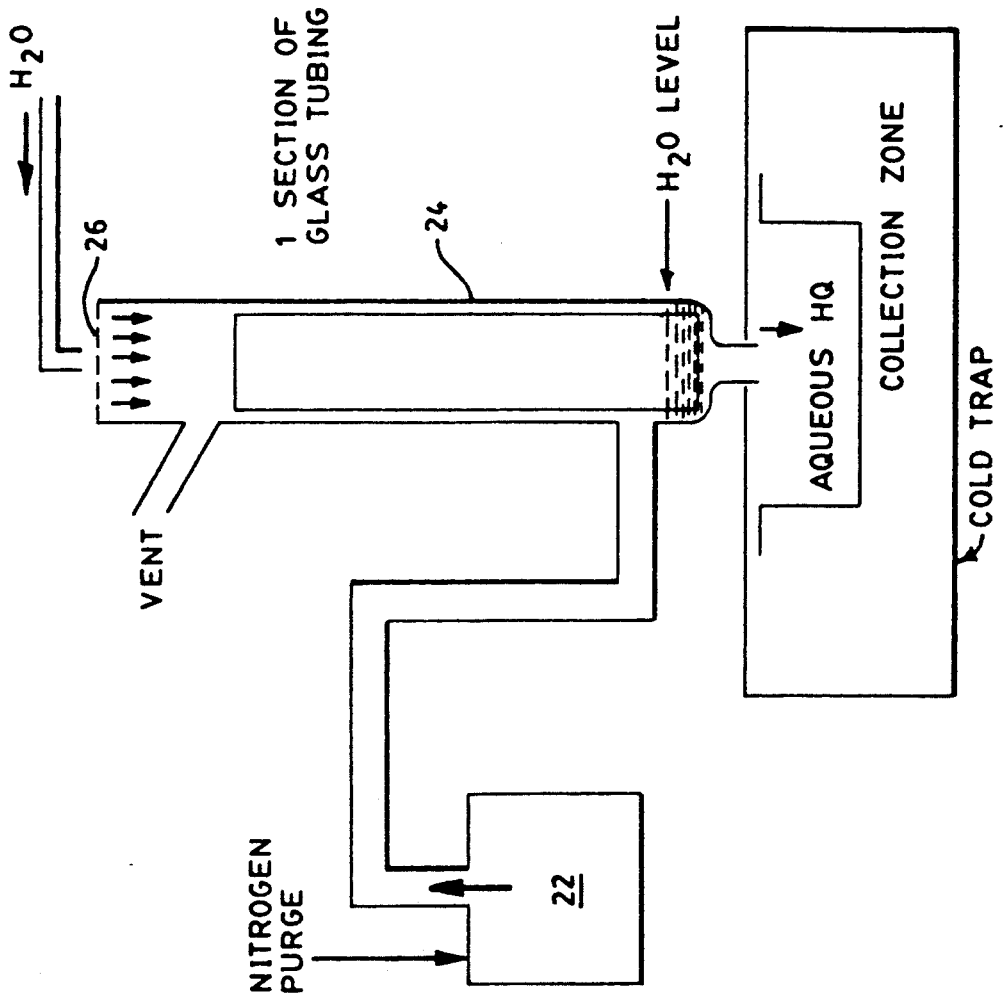
FIG. 2 illustrates the countercurrent HCl anhydrous to aqueous conversion system.

A second embodiment of the present invention is illustrated in FIG. 2. Here anhydrous HCl vapor 22 enters the scrubbing vessel 24 near the bottom. The interior of the scrubber vessel is packed with a suitable inert interaction medium, e.g., a stack of glass sections of tubing. Counter streaming to the HCl vapor is a current of water from the shower head water inlet 26, which effectively converts the anhydrous HCl to aqueous HCl.

The system illustrated in FIG. 1 is particularly effective for low HCl flow rates, e.g., up to about 5 gm/min. To accommodate higher HCl flow rates, e.g., up to about 45 gm/min., a system such as that illustrated in FIG. 2 is employed. It has been discovered that an advantageous rate of water flow in one preferred FIG. 2 type system [75 cm long × 5 cm diameter; packed with 60 cm of 1"13 × 15 mm glass sections] is 2.64 liters/min., but the skilled artisan will readily be capable of adjusting optimum flow rates for other sized scrubbers.

It is advisable that these scrubbing systems be used inside a hood area, because of the risk of escaping HCl gas which can be irritating.

Figure 3:
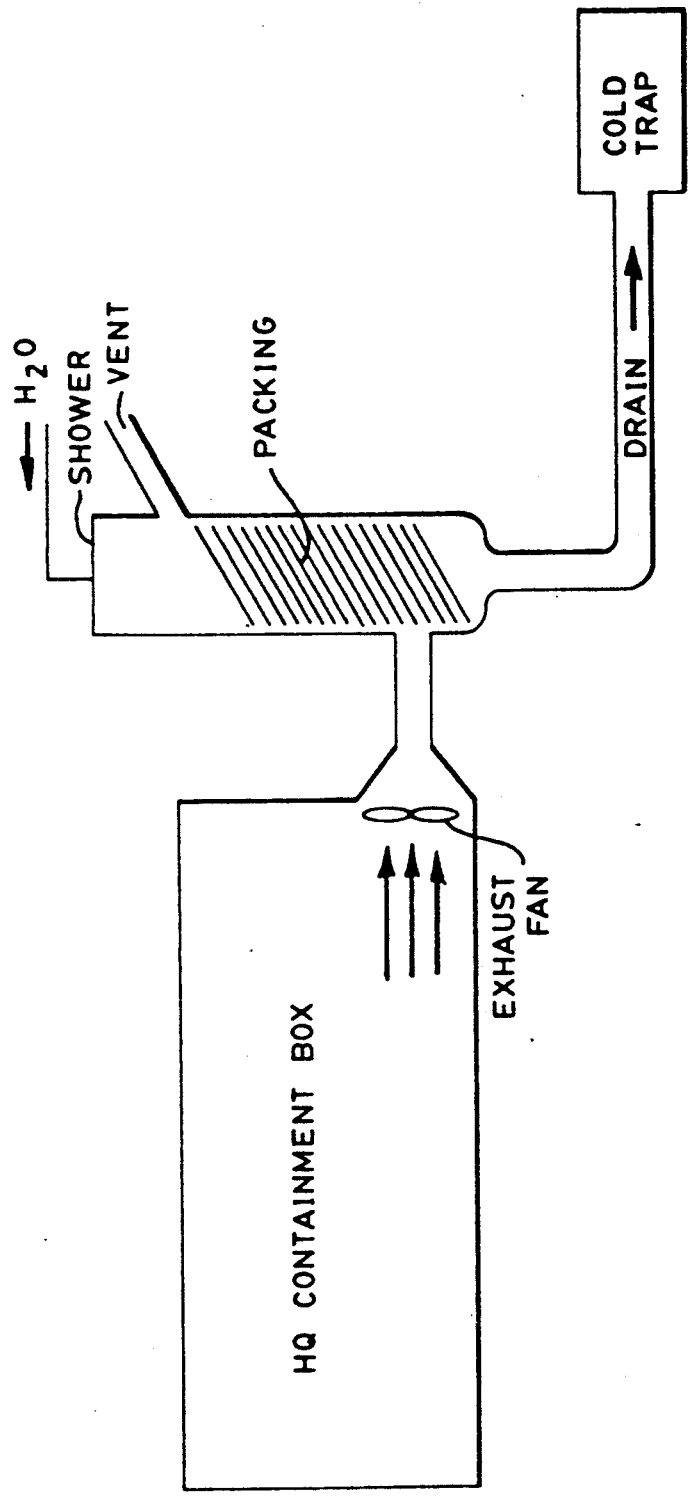
FIG. 3 illustrates the use of the countercurrent HCl anhydrous to aqueous conversion system as an emergency HCl scrubber system.

The scrubber systems of the present invention could also be used on an emergency basis in the event of an HCl leak during $^{196}$Hg isotope separation processing. Process flow rates of HCl that have been utilized are typically 3 gm/min. An exhaust fan could be used to force the HCl vapor through packing as shown in FIG. 3.

The embodiment of FIG. 2 has also been used to measure the amount of anhydrous HCl collected from a $^{196}$Hg isotope separation process. This was done by measuring the acid normality of the collected drain water. Comparison with the effluent cold trap weight before and after HCl evaporation gave good agreement with the normality measurement.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. Apparatus for converting anhydrous HCl from a cold trap from a Hg$^{199}$ enrichment system to aqueous HCl without the use of air flow to carry the HCl vapor from said cold trap into the converter system, said apparatus consisting of:
   a cold trap containing frozen anhydrous HCl from a Hg$^{199}$ enrichment system, said cold trap having an outlet and including means for heating said cold trap for removing HCl from said cold trap;
   a suitable container having:
   (a) an anhydrous HCl gas inlet connected directly to said outlet from said cold trap;
   (b) means for introducing a flow of water in a counter current flow relative to the direction of HCl gas flow:
   (c) an inert gas/liquid interaction medium for the formation of aqueous hydrogen chloride through interaction of the gaseous and aqueous species present;
   (d) an outlet for the aqueous hydrogen chloride formed therein.

2. The apparatus of claim 1, wherein the flow of water relative to the HCl gas flow is countercurrent.

3. The apparatus of claim 1, wherein the flow of water relative to the HCl gas flow is cocurrent.

4. The apparatus of claim 1 wherein the gas/liquid interaction medium is glass pieces.

5. The apparatus of claim 1 wherein the gas/liquid interaction medium is glass wool.

* * * * *